US009399561B2

(12) United States Patent
Lahti et al.

(10) Patent No.: US 9,399,561 B2
(45) Date of Patent: Jul. 26, 2016

(54) DRIVE ROLL CARRIER FOR WELDING WIRE FEEDER

(71) Applicant: Illinois Tool Works Inc., Glenview, IL (US)

(72) Inventors: Thomas D. Lahti, Combined Locks, WI (US); Nicholas A. Matiash, Oshkosh, WI (US)

(73) Assignee: Illinois Tool Works Inc, Glenview, IL (US)

(*) Notice: Subject to any disclaimer, the term of this patent is extended or adjusted under 35 U.S.C. 154(b) by 315 days.

(21) Appl. No.: 13/962,511

(22) Filed: Aug. 8, 2013

(65) Prior Publication Data

US 2014/0054349 A1    Feb. 27, 2014

Related U.S. Application Data

(60) Provisional application No. 61/692,806, filed on Aug. 24, 2012.

(51) Int. Cl.
  *B65H 54/44* (2006.01)
  *B23K 9/133* (2006.01)
  *F16B 7/20* (2006.01)
  *B65H 51/10* (2006.01)

(52) U.S. Cl.
  CPC ............... *B65H 54/44* (2013.01); *B23K 9/133* (2013.01); *B23K 9/1336* (2013.01); *B65H 51/10* (2013.01); *F16B 7/20* (2013.01); *B65H 2701/36* (2013.01)

(58) Field of Classification Search
  CPC ........ B65H 51/32; B65H 54/44; B65H 54/54; B23K 9/133; B23K 9/1336
  See application file for complete search history.

(56) References Cited

U.S. PATENT DOCUMENTS

| 4,020,927 | A  | 5/1977  | Collins     |
| 5,816,466 | A  | 10/1998 | Seufer      |
| 6,536,644 | B2 | 3/2003  | Plow        |
| 6,568,578 | B1 | 5/2003  | Kensrue     |
| 7,615,723 | B2 | 11/2009 | Matiash     |
| 7,977,604 | B2 | 7/2011  | Ertmer      |
| 2005/0224486 | A1 | 10/2005 | Matiash    |
| 2011/0114613 | A1 | 5/2011  | Ihde et al. |
| 2012/0152924 | A1 | 6/2012  | Christopher |

FOREIGN PATENT DOCUMENTS

| CN | 101811242 | 8/2010  |
| CN | 201645000 | 11/2010 |

OTHER PUBLICATIONS

International Search Report for International Application No. PCT/US2013/056266, International filing date Aug. 22, 2013, Mailed Jul. 1, 2014.

*Primary Examiner* — Michael McCullough
(74) *Attorney, Agent, or Firm* — Boyle Fredrickson, S.C.

(57) ABSTRACT

A drive roll carrier is provided for use with a wire feeder for a welder that includes a hub that can be rotated by a gear and that may include at least one lug that extends longitudinally along and radially out from the hub and at least one retainer that extends from an outer surface of the hub. The retainer may be fixed in a longitudinal direction with respect to the hub and may be movable in a radial direction for allowing mounting of a drive roll onto the hub. An outer end of the lug may include an alignment segment that has a different profile shape than the rest of the lug to facilitate alignment of a mounting groove of the drive roll with the lug.

16 Claims, 8 Drawing Sheets

DRIVE ROLL CARRIER FOR WELDING WIRE FEEDER

CROSS-REFERENCE TO RELATED APPLICATIONS

This application claims priority to U.S. Provisional Patent Application Ser. No. 61/692,806, filed on Aug. 24, 2012, the entirety of which is expressly incorporated by reference herein.

FIELD OF THE INVENTION

The present invention relates generally to welding wire feeders and, in particular, to driver roll carriers that support and rotate drive rolls within welding wire feeders.

BACKGROUND OF THE INVENTION

Some drive rolls of welding wire feeders are secured to drive roll carriers by way of fasteners so that tools are required for removing and mounting the drive rolls. Some known tool-less drive roll carriers require dexterous manipulation of one or more components of the drive roll carriers, which can be difficult to do when wearing welding gloves. One known tool-less drive roll carrier has ball bearing detents that can both hold a drive roll onto the carrier and also eject or move the drive roll away from its mounted position on the drive roll carrier. This is done by a configuration of the drive roll carrier in which a button can be pushed to move the ball bearing detents longitudinally along the drive roll carrier to allow the ball bearing detents to engage an inner surface of the drive roll and pull the drive roll away from its mounted position. Such a drive roll carrier requires sufficient space around the drive roll carrier for the button to occupy and to allow for manipulation of the button.

SUMMARY OF THE INVENTION

The present invention is directed to a drive roll carrier that has a simple and compact configuration that allows for quick aligning of a drive roll while mounting it to the drive roll carrier and that allows for mounting and removing the drive roll by pushing it onto the drive roll carrier and pulling it off from the drive roll carrier, without requiring manipulation of any drive roll carrier components. The drive roll carrier may include driving lugs for engaging slots of a drive roll for rotating the drive roll. Ends of the lugs may be arranged with respect to retainers of the drive roll carrier so that the lugs engage the drive roll before the retainers engage the drive roll while mounting the drive roll to the drive roll carrier. This may allow for self-aligning of the drive roll onto the drive roll carrier, which may prevent misalignment of drive roll slots onto retainers instead of the driving lugs.

According to one aspect of the invention, a drive roll carrier is provided for use with a wire feeder for a welder that includes a hub that can be rotated by a gear and that may include at least one lug that extends longitudinally along and radially out from the hub and at least one retainer that extends from an outer surface of the hub. The retainer(s) may be fixed in a longitudinal direction with respect to the hub and may be movable in a radial direction for allowing mounting of a drive roll onto the hub. An outer end of the lug(s) may include an alignment segment that has a different profile shape than the rest of the lug to facilitate alignment of a mounting groove(s) of the drive roll with the lug(s). This may simplify aligning a drive roll to a proper mounting position and may allow for tool-less mounting of the drive roll without requiring manipulation of any component of the drive roll carrier.

According to another aspect of the invention, the lug may include an alignment segment arranged with respect to the retainer to engage the drive roll before the retainer engages the drive roll while mounting the drive roll on the drive roll carrier. A bearing may be arranged at each of the hub inner and outer ends for supporting the hub for rotation. The gear and hub may be integral with each other so that the bearing of the hub inner end is arranged within the gear. The lug may have a generally rectangular cross-sectional shape. The lug may be defined by a pin that has a generally circular cross-sectional shape. The lug may include an alignment segment that has a different profile shape than the rest of the lug. The alignment segment may include a ramped surface that extends angularly toward the hub at the outer end of the lug. The alignment segment may include a domed surface at the outer end of the lug. This may allow for self-aligning of the drive roll onto the drive roll carrier According to another aspect of the invention, the hub outer circumferential surface may define an outer opening that has a generally circular perimeter shape and through which at least a portion of the retainer extends. The retainer may be a ball bearing arranged to deflect inwardly when the drive roll slots over the retainer and bias against an outer surface of the drive roll to hold the drive roll in place. The hub outer circumferential surface may be defined at a hub side wall that includes an opposing inner circumferential surface and a pocket may extend from the outer opening at the outer circumferential surface to an inner opening at the inner circumferential surface of the hub side wall. The outer opening at the hub outer circumferential surface may be smaller than the inner opening at the hub inner circumferential surface. This may allow for a retainer that does not have to translate longitudinally with respect to the drive roll carrier while allowing for self-alignment of a drive roll being mounted to the drive roll carrier without misaligning slots of the drive roll onto the retainer(s).

According to another aspect of the invention, the pocket may extend through a first segment of the hub side wall and an access hole aligned with the pocket may extend through a second, opposing segment of the hub side wall. The pocket may extend angularly through the hub side wall so that the inner and outer openings of the pocket are provided at different locations along the length of the hub. The inner opening of the pocket may be arranged closer to the hub outer end than the outer opening of the pocket. This may allow for relatively easy assembly of retainers into a drive roll carrier that is arranged to engage a drive roll after the drive roll is properly aligned with driving lugs of the drive roll carrier.

Figure 1:
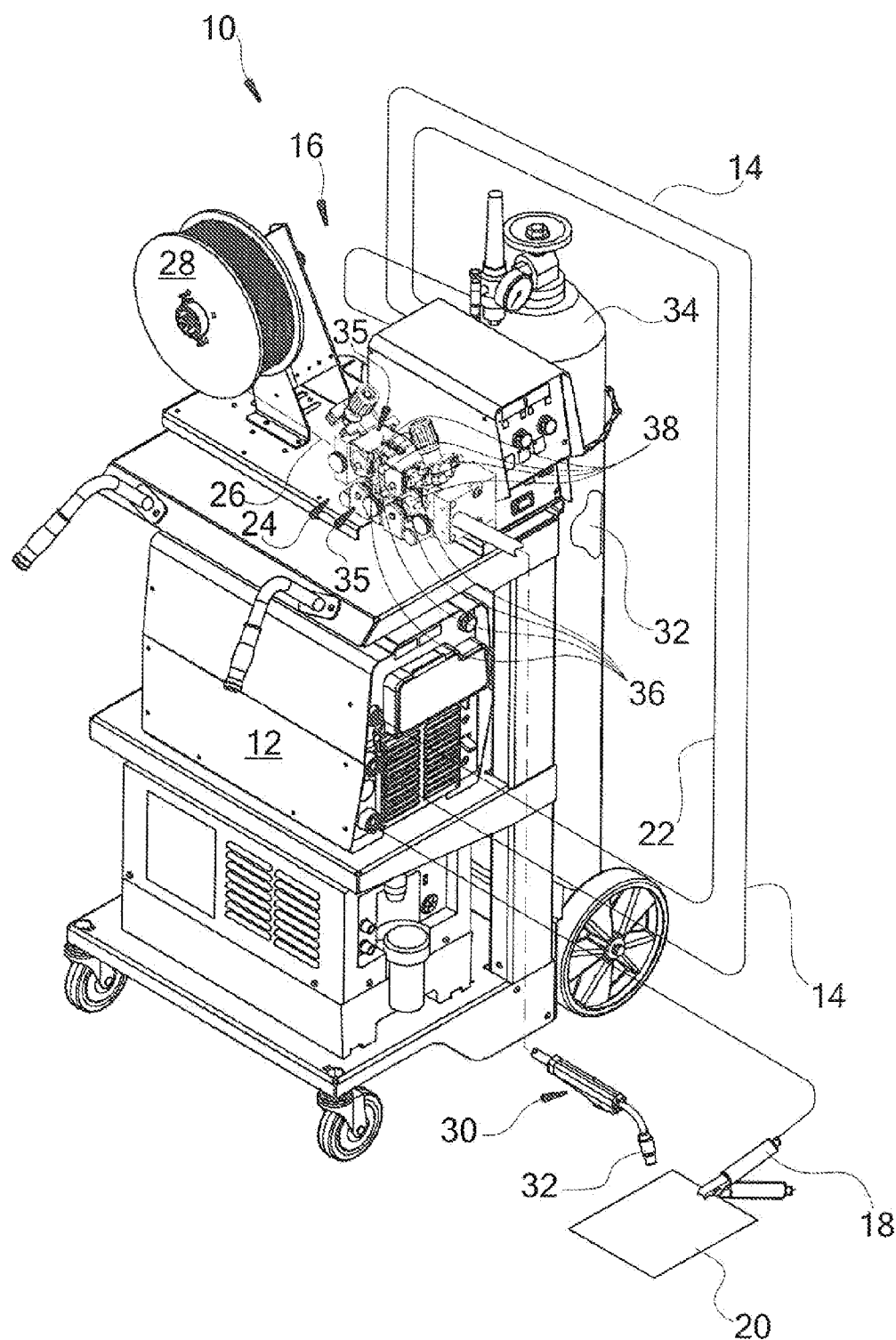
FIG. 1 is a simplified, partially schematic representation of a welding system incorporating a drive roll carrier in accordance with the present invention.

Before the embodiments of the invention are explained in detail, it is to be understood that the invention is not limited in its application to the details of construction and of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including", "comprising", and variations thereof is meant to encompass the items listed thereafter and equivalents thereof as well as additional items and equivalents thereof.

DETAILED DESCRIPTION OF THE PREFERRED EMBODIMENTS

FIG. 1 shows a simplified partially schematic representation of a welding system 10. The welding system 10 includes a power source 12 that provides electrical power for a welding process. Weld cables 14 connect the power source 12 to a wire feeder 16 and, through a work clamp 18, to a work-piece 20 that will be welded during the welding process. Control cable 22 operably connects control systems of the power source 12 and wire feeder 16 for controlling, for example, weld arc and wire feed rate characteristics, as is known. Although shown as being separate, it is understood that the power source 12 and wire feeder 16 may be combined in a single machine.

Still referring to FIG. 1, wire feeder 16 includes a drive 24 that receives weld wire 26 from a spool 28 and conveys the weld wire 26 through a welding torch or welding gun 30 so that the weld wire 26 exits through a contact tip (not shown) that is held within a nozzle 32 of the welding gun 30. The weld wire 26 is a known consumable electrode that is used as filler material during the welding process and can be made from any of a variety of suitable metals, including mild or stainless steel, nickel, and aluminum. Shielding gas 32 is supplied from a bottle 34 to the wire feeder 16 and is directed through the welding gun 30 and out of the nozzle 32 for providing a gas-shielded environment around a weld arc established during the welding process.

Still referring to FIG. 1, the drive 24 of the wire feeder 16 includes a drive roll carrier arrangement having supports 35 that, as shown here, support drive roll carriers 36 in a simply supported manner from both ends. The supports 35 toward the bottom of the drive 24 may define a bracket(s) that is fixed to the drive 24, and the support 35 toward the top of the drive 24 may define swing arms that can pivot with respect to the drive 24 to allow for adjusting a pinch force against the weld wire 26 and permitting access to components of the drive 24. The drive roll carriers 36 support drive rolls 38 and are driven into rotation by a motor not shown) of the drive 24. FIG. 1 shows two pairs of drive roll carriers 36 and drive rolls 38 that engage opposing sides of the weld wire 26 for driving the weld wire 26 through the welding gun 30, although it is understood that a single pair of drive roll carriers 36 and drive rolls 38 may be implemented for driving the weld wire 26 through the welding gun 30.

Figure 2:
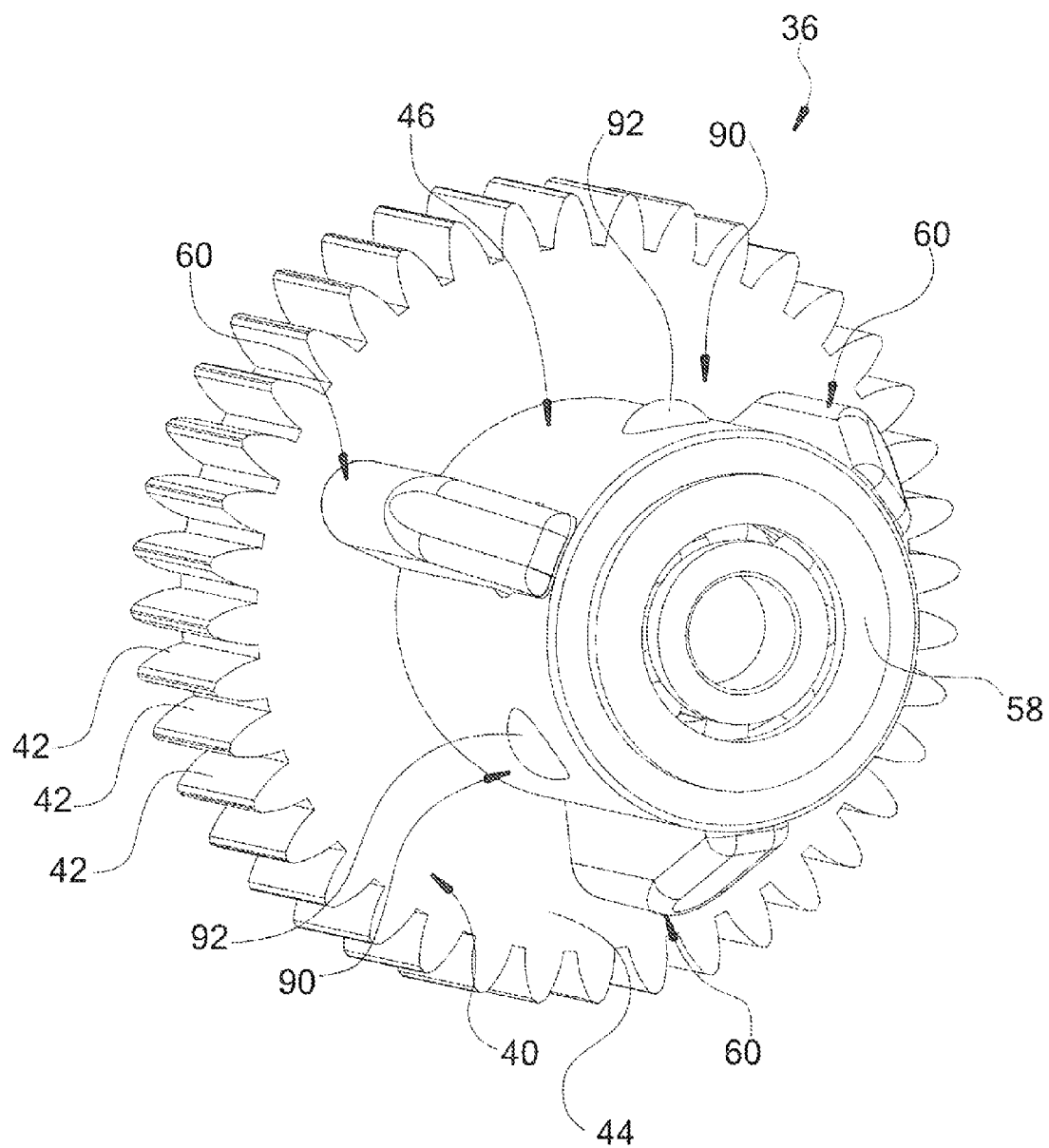
FIG. 2 is a pictorial view of the drive roll carrier of FIG. 1.

Referring now to FIG. 2, drive roll carrier 36 includes a gear 40 that is driven to rotate by engagement of teeth 42 of the gear 40 with a cooperating gear of a gear train of the wire feeder drive 24 or a gear on an output shaft of the motor of the wire feeder drive 24. The gear 40 has an outwardly facing surface 44, and a hub 46 extends from the outwardly facing surface 44 of the gear 40. The hub 46 is arranged with respect to the gear 40 so that rotation of the gear 40 is translated into rotation of the hub 46. The hub 46 may be attached to the gear 40 or integral with the gear 40.

Figure 3:
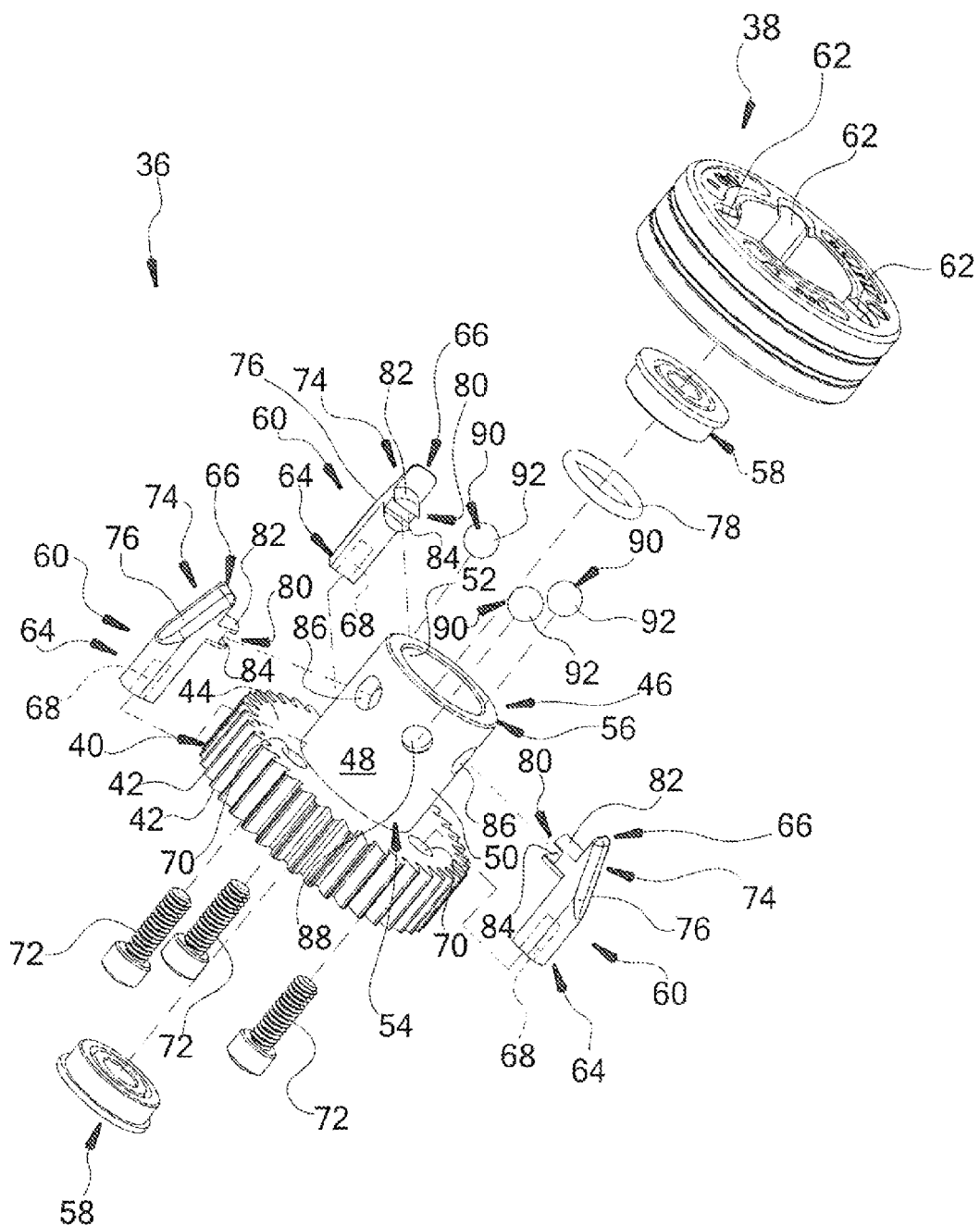
FIG. 3 is an exploded pictorial view of the drive roll carrier of FIG. 2.

Referring now to FIG. 3, the hub 46 is cylindrical with a circumferential side wall, shown as hub side wall 48 that defines outer and inner circumferential surfaces 50, 52. An inner end 54 of the hub 46 is arranged nearest the gear 40 and an outer end 56 of the hub 46 is spaced from the gear 40 and is configured to receive the drive roll 38 while mounting the drive roll 38 upon the drive roller carrier 36. A bearing 58 is arranged at each of the hub inner and outer ends 54, 56 for supporting the drive roll carrier 36 for rotation in a simply supported manner within the drive 22 (FIG. 1). In an embodiment in which the gear 40 and hub 46 are integral with each other, the bearing 58 supporting the inner end 54 of the hub 46 may be arranged within the gear 40.

Referring now to FIGS. 2 and 3, lugs 60 extend longitudinally with respect to the hub 46 and radially outward from the hub outer circumferential surface 50. The lugs 60 may engage or be spaced from the hub outer circumferential surface 50. The lugs 60 are configured to engage slots 62 in the drive roll 38 for transferring rotation of the drive roll carrier 36 to rotate the drive roll 38. As shown in this embodiment, the lugs 60 are lobes that have generally rectangular cross-sectional shapes, as defined at least partially between a pair of generally flat side walls and which may have rounded outer surfaces so as to correspond to the profile shapes of the drive roll slots 62. Each lug 60 has an inner end 64 that is arranged nearest the gear 40 and an outer end 66 that is spaced from the gear 40 and is configured to receive the drive roll slots 62 while mounting the drive roll 38 upon the drive roll carrier 36. As shown in FIG. 3, the inner ends 64 of the lugs 60 include threaded bores 68 that align with bores 70 that extend through the gear 40. Fasteners 72 extend through the bores 70 of the gear 40 and engage the threaded bores 68 to attach the lugs 60 to the drive roll carrier 36.

Referring again to FIGS. 2 and 3, each of the lugs 60 includes an alignment segment 74 that is defined at the outer end 66 of the lug 60 and that is configured to allow for quick aligning of the drive roll slots 62 with the lugs 60. The alignment segments 74 of the lugs 60 may be arranged to be the first structure(s) of the drive roll carrier 36 that engages the drive roll slots 62 while mounting the drive roll 38 upon the drive roll carrier 36. This may allow for quick aligning of the drive roll 38 upon the drive roll carrier 36 while mounting the drive roll 38 to the drive roll carrier 36. The alignment segment 74 may have a different profile shape than an adjacent portion of the lug 60, shown as having a different profile shape than the rest of the lug 60. In this embodiment, the alignment segment 74 has a ramped surface 76 that tapers downwardly, extending angularly toward the hub 46 at the outer end 66 of the lug 60.

Figure 4:
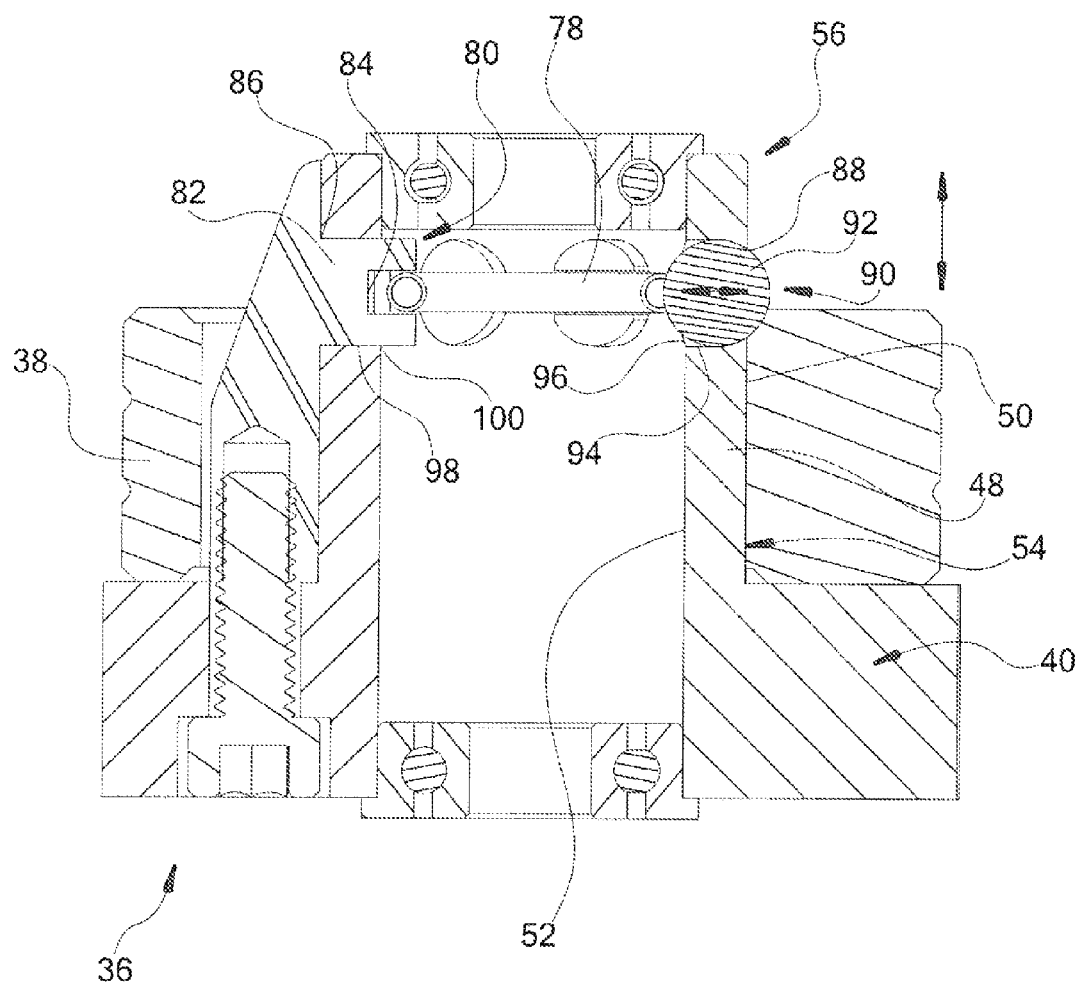
FIG. 4 is a cross-sectional view of the drive roll carrier of FIG. 2.

Referring again to FIG. 3, a spring 78 is held in a spring retainer 80. In this embodiment, the spring 78 is an annular spring and the spring retainer 80 includes posts 82 that extend from the alignment segments 74 of the lugs 60 in directions opposite the ramped surfaces 76. Each post 82 has a slot 84 that extends into an end surface of the post 82 and that engages the spring 78 so that the spring 78 is supported at multiple locations about its periphery. The posts 82 extend through a first set of openings 86 that extend through the hub side wall 48 and position the spring 78 concentrically inside of the hub side wall 48 adjacent the inner circumferential surface 52 (FIG. 4). The openings 86 through which the posts 82 extend are spaced from each other about the hub 46 and are separated from each other by a second set of openings 88 so that the openings 86 and openings 88 alternate with respect to each other about the hub 46. In this way, each opening 88 is arranged across the hub 46 from one of the openings 86.

Still referring to FIG. 3, a drive roll retainer 90 extends outwardly from each of the openings 88. The drive roll retainer 90 in this embodiment is arranged relatively further from the outer end 56 than the alignment segments 74 of the lugs 60. In this way, the drive roll 38 engages the drive roll retainer 90 after engaging the alignment segment 74 of the lug 60, such that the drive roll 38 self-aligns with respect to the lug 60 of the drive roll carrier 36 before being secured into place by the drive roll retainer 90. The drive roll retainer 90 is configured for accommodating mounting of and selectively holding the drive roll 38 on the drive roll carrier 36. In this embodiment, the drive roll retainers 90 are ball bearings 92 that are fixed in a longitudinal direction with respect to the hub 46 and movable in a generally radial direction with respect to the hub 46.

Referring to FIG. 4, the ball bearings 92 are supported from behind by the spring 78, and the openings 88 have generally circular perimeter shapes (FIG. 3) and have widths that are smaller than the diameters of the ball bearings 92. This allows portions of the ball bearings 92 to extend outwardly beyond the hub outer circumferential surface 50 while preventing the ball bearings 92 from entirely passing out of the openings 88. In this way, the drive roll retainers 90 act as detents that hold the drive roll 38 by engaging an outwardly facing surface of the drive roll 38 while allowing the drive roll 38 to push in and pass over the top of the drive roll retainers 90 when a user pushes or pulls the drive roll 38 to mount or dismount the drive roll 38 from the drive roll carrier 36.

As shown in FIG. 4, pockets 94 extend through the hub side wall 48 so that the openings 88 define outer openings of the pockets 94 at the hub outer circumferential surface 50. The pockets 94 extend from the outer openings 88 through the rest of the thickness of the hub side wall 48. The pockets 94 house the ball bearings 92 therein and define inner opening 96 at the hub side wall inner circumferential surface 52. The pockets 94 and openings 88 that confine the ball bearings 92 may be made by, for example, passing a ball end mill from a direction of the inner opening 96 toward the opening 86 without entirely passing through the hub side wall 48 or by forming the pocket 94 and then swaging the opening 86 to a smaller size. In this embodiment, the pocket(s) 94 extends radially through the hub side wall 48 so that the outer and inner openings 88, 96 of the pockets 94 are coaxially aligned with each other, relative to a radial direction through the hub side wall 48. In another embodiment, the pockets 94 and openings 88 are arranged at different locations along the length of the hub 46 so that the pocket 94 extends generally radially through the hub side wall 48, but angularly instead of substantially perpendicular with respect to the outer and inner circumferential surfaces 50, 52.

Still referring to FIG. 4, a bore 98 extends through the thickness of the hub side wall 48 from the opening 86 to an inner opening 100. The pockets 94 and bores 98 of this embodiment are coaxially aligned with each other and extend through the side wall 48 substantially perpendicular with respect to the outer and inner circumferential surfaces 50, 52. In another embodiment, the pockets 94 and bores 98 are aligned with each other and extend angularly through the hub side wall 48. Respective pairs of the pockets 94 and bores 98 are aligned with each other so that they can be made with a machining tool in a single pass, passing along a single straight line travel path for each pair of pockets 94 and bores 98, establishing common angles of inclination with respect to the hub side wall 48.

Figure 5:
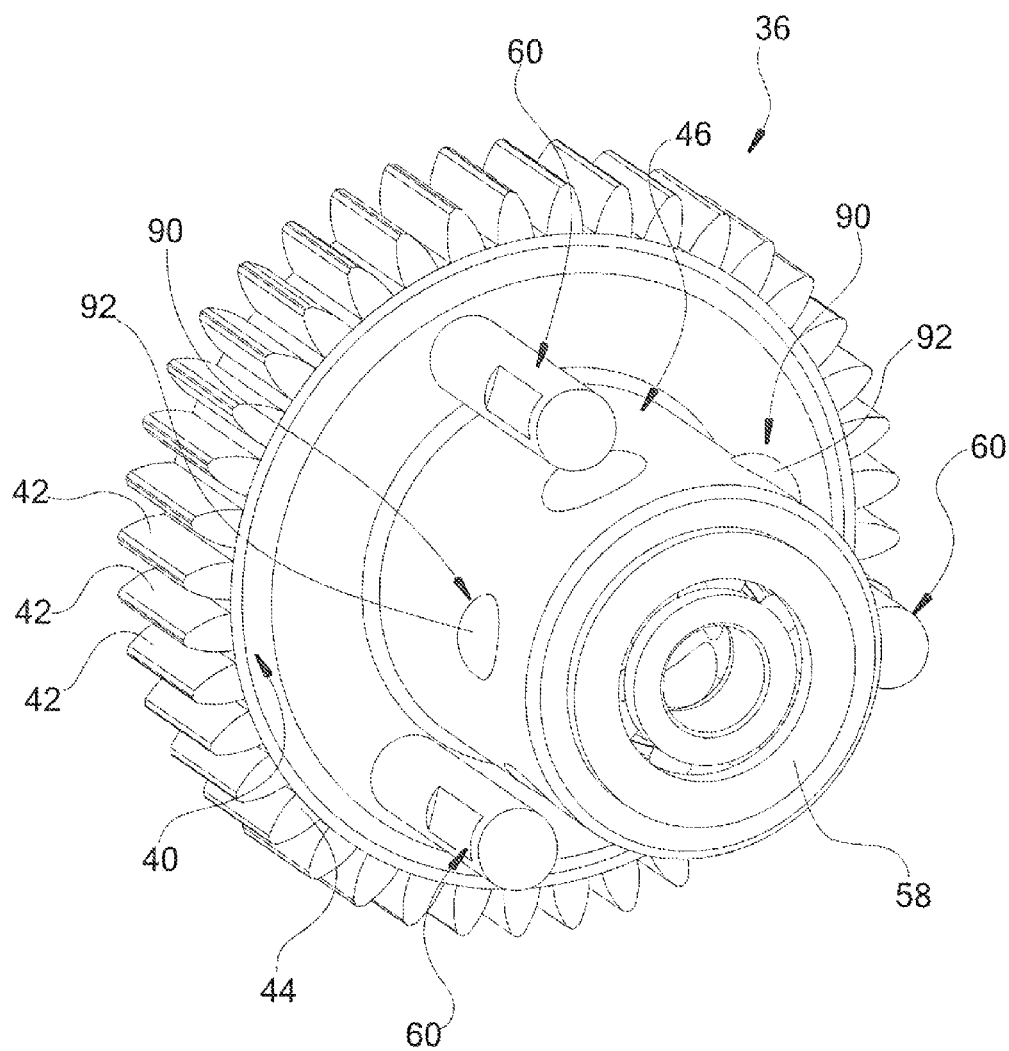
FIG. 5 is a pictorial view of a variant of the drive roll carrier of FIG. 2.
Figure 6:
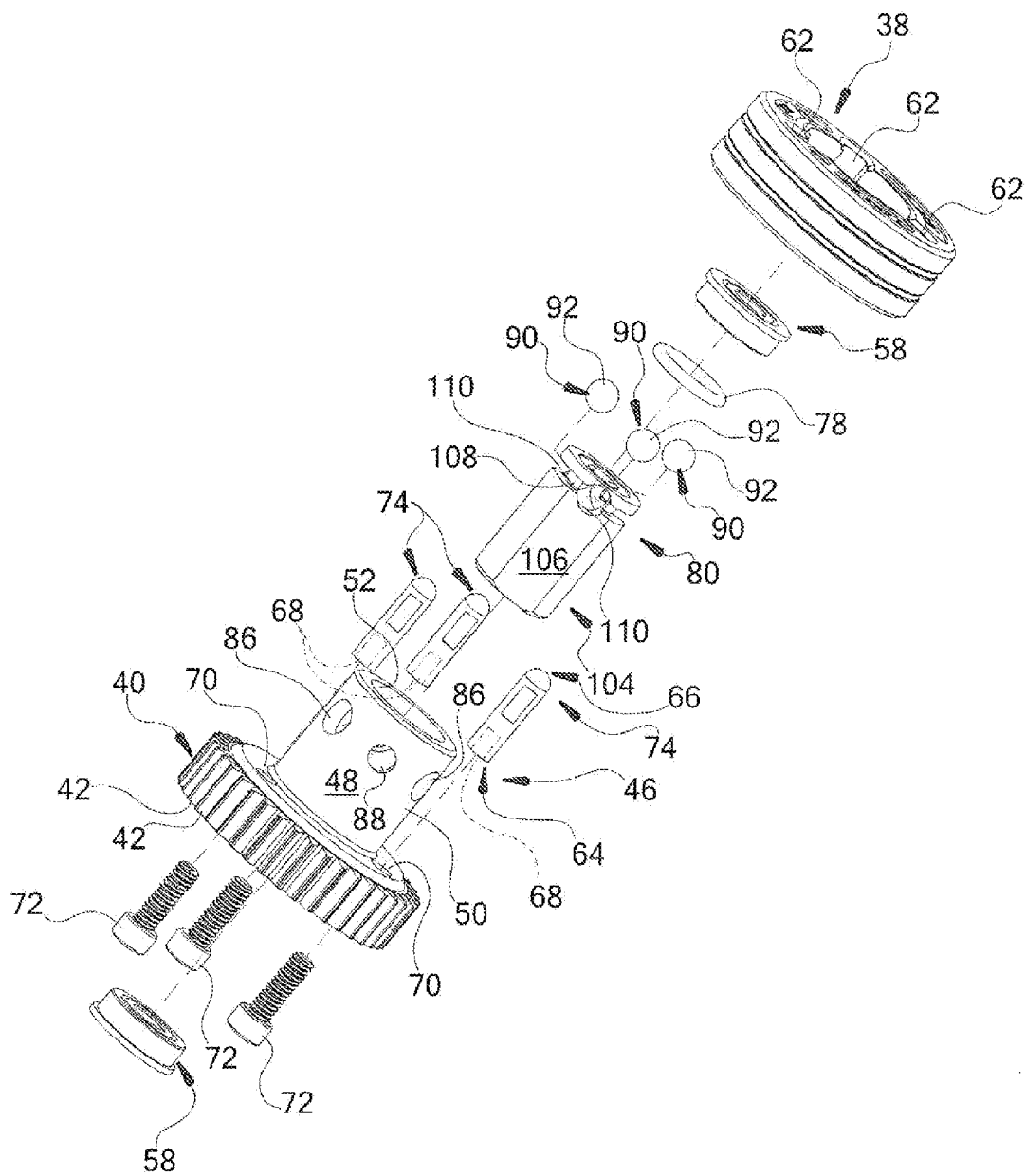
FIG. 6 is an exploded pictorial view of the drive roll carrier of FIG. 5.

Referring now to FIGS. 5 and 6, the drive roll carrier 36 is mostly identical to that described with respect to FIGS. 2-4, whereby such descriptions are applicable here with respect to the drive roller carrier 36 of FIGS. 5 and 6. The drive roll carrier 36 of FIGS. 5 and 6 differs from that described in FIGS. 2-4 in the following ways. Referring to FIG. 5, the lugs 60 are pins that have generally circular cross-sectional shapes. In this way, the lugs 60 of this embodiment are radially spaced from the hub side wall outer circumferential surface 50. The alignment segments 74 of the lugs 60 include domed surfaces 102 at the lug outer ends 66.

Referring now to FIG. 6, spring retainer 80 includes a sleeve 104 that is concentrically housed within the hub 46. The sleeve 104 has a side wall 106 with a groove 108. The groove 108 extends about the entire periphery and radially into an outer surface of the side wall 106. Depressions 110 that have hemispherical shapes extend into the outer surface of the side wall 106. The depressions 110 are spaced from each other and each intersects the groove 108 at different locations. In this way, the spring 78 is held in the groove 108 and therefore supported by the sleeve 104, and the ball bearings 92 are held between the depressions 110 and the openings 88 while being biased radially outwardly by the spring 78.

Figure 7:
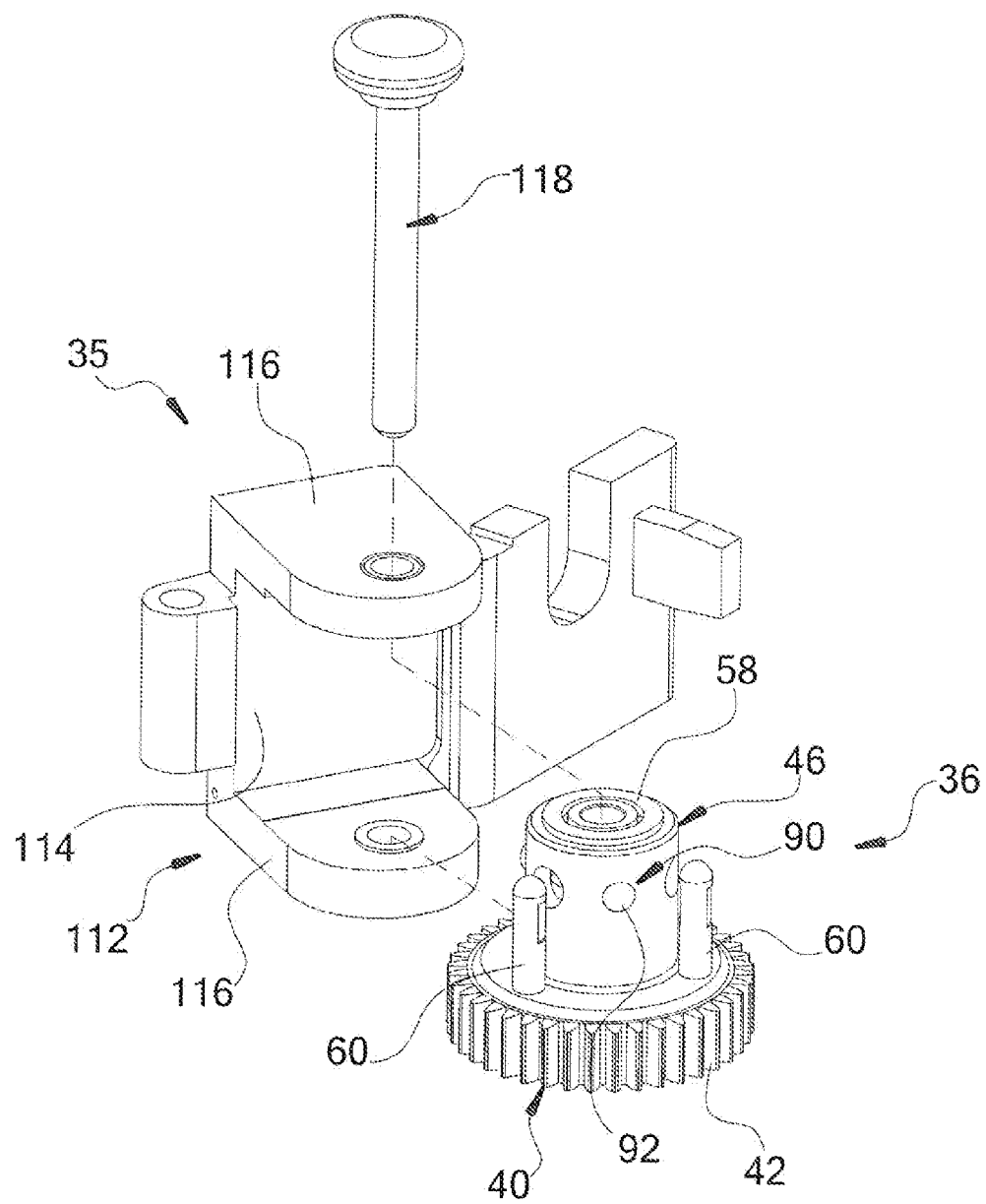
FIG. 7 is a pictorial view of a drive roll carrier arrangement incorporating the drive roll carrier of FIG. 6.
Figure 8:
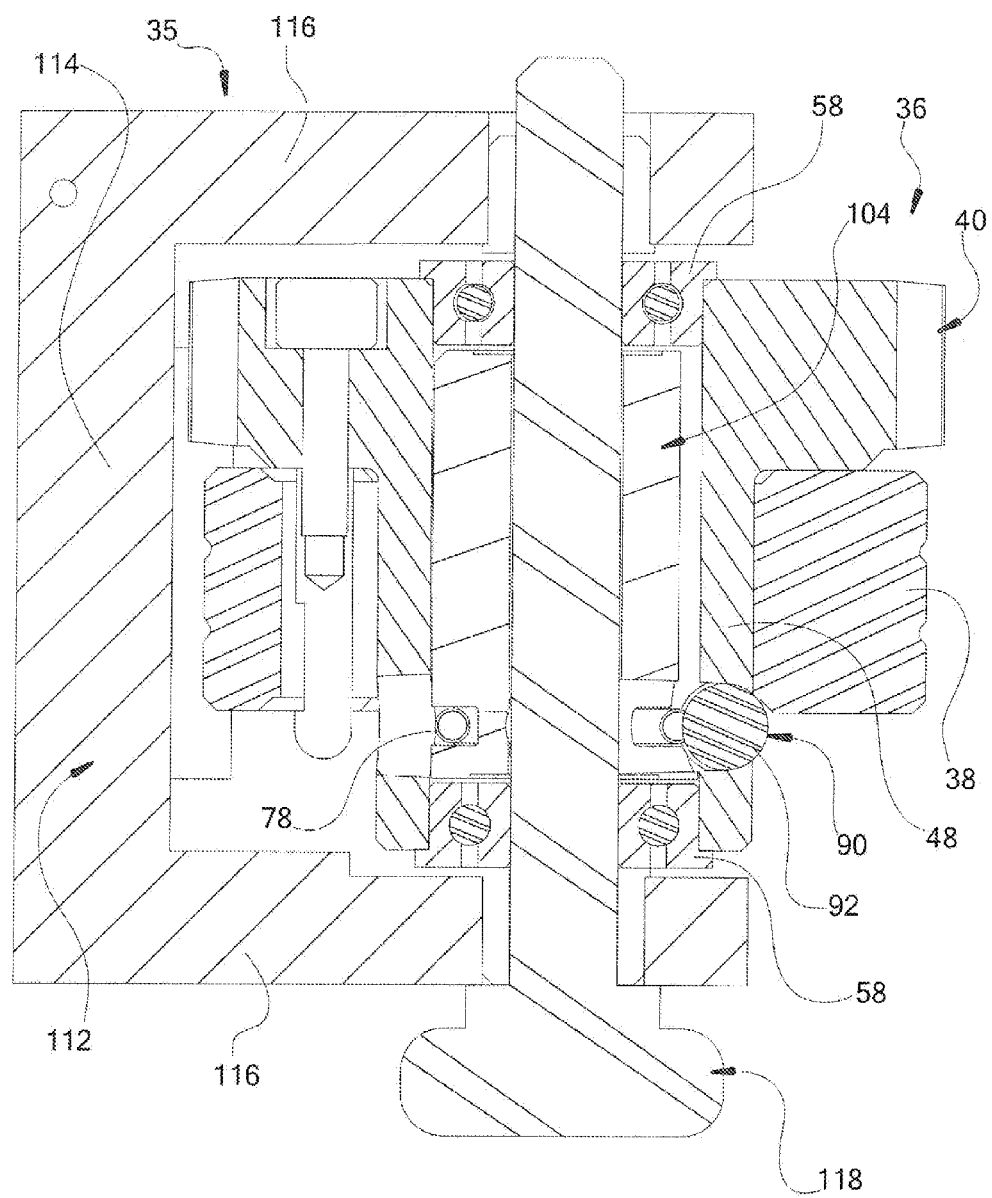
FIG. 8 is a cross-sectional view of the drive roll carrier arrangement of FIG. 7.

Referring now to FIGS. 7 and 8, the drive roll carrier arrangement is shown with a support 35 in a swingarm configuration that defines a yoke segment 112 with the back wall 114 and a pair of arms 116 that extend from opposing ends of the back wall 114. A fastener 118, shown as a thumbscrew, secures the drive roll carrier 36 between the arms 116 to support the drive roll carrier 36 and the drive roll 38 (FIG. 8) in a simply supported manner, from both ends.

Various features of the invention are set forth in the following claims. It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed is:

1. A drive roll carrier for supporting a drive roll in a wire feeder of a welder, the drive roll carrier comprising:
   a gear that can be driven to rotate;
   a hub defining an outer circumferential surface and supporting a drive roll to convey a welding wire, the hub arranged with respect to the gear so that rotation of the gear is translated into rotation of the hub and the drive roll, the hub including an inner end relatively closer to the gear and an outer end relatively farther from the gear and configured to receive the drive roll for mounting the drive roll on the drive roll carrier;
   a retainer that extends from the outer circumferential surface of the hub and fixed in a longitudinal direction with respect to the hub and movable in a generally radial direction with respect to the hub for accommodating mounting of and selectively holding the drive roll on the drive roll carrier;
   a lug that extends longitudinally with respect to the hub and radially outward of the hub outer circumferential surface, the lug engaging the drive roll for transferring rotation of the hub to the drive roll and having an outer end that is arranged closer to the hub outer end than the retainer so that the drive roll engages the outer end of the lug to align the drive roll with the lug while mounting the dive roll on the drive roll carrier; and wherein during dismounting the drive roll, the retainer remains fixed in the longitudinal direction with respect to the hub and moves inwardly in the generally radial direction with respect to the hub to allow the drive roll to pass over the top of the retainer.

2. The drive roll carrier of claim 1, wherein the lug includes an alignment segment arranged with respect to the retainer to engage the drive roll before the retainer engages the drive roll while mounting the drive roll on the drive roll carrier.

3. The drive roll carrier of claim 1, further comprising a bearing at each of the hub inner and outer ends for supporting the hub for rotation.

4. The drive roll carrier of claim 1, wherein the lug has a generally rectangular cross-sectional shape.

5. The drive roll carrier of claim 1, wherein the lug is a pin that has a generally circular cross-sectional shape.

6. The drive roll carrier of claim 1, wherein the lug includes an alignment segment that has a different profile shape than the rest of the lug.

7. The drive roll carrier of claim 6, wherein the alignment segment includes a ramped surface that extends angularly toward the hub at the outer end of the lug.

8. The drive roll carrier of claim 6, wherein the alignment segment includes a domed surface at the outer end of the lug.

9. The drive roll carrier of claim 1, wherein the hub outer circumferential surface defines an outer opening that has a generally circular perimeter shape and through which at least a portion of the retainer extends.

10. The drive roll carrier of claim 9, wherein the retainer is a ball bearing.

11. The drive roll carrier of claim 9, wherein the hub outer circumferential surface is defined at a hub side wall that includes an opposing inner circumferential surface and wherein a pocket extends from the outer opening at the outer circumferential surface to an inner opening at the inner circumferential surface of the hub side wall.

12. The drive roll carrier of claim 11, wherein the outer opening at the hub outer circumferential surface is smaller than the inner opening at the hub inner circumferential surface.

13. The drive roll carrier of claim 11, wherein the pocket extends through a first segment of the hub side wall, and an access hole that is aligned with the pocket extends through a second, opposing segment of the hub side wall.

14. The drive roll carrier of claim 11, wherein the pocket extends radially through the hub side wall.

15. The drive roll carrier of claim 14, wherein the access hole and pocket are coaxially aligned with each other.

16. A drive roll carrier for supporting a drive roll in a wire feeder of a welder, the drive roll carrier comprising:

a gear that can be driven to rotate;

a hub defining an outer circumferential surface and supporting a drive roll to convey a welding wire, the hub arranged with respect to the gear so that rotation of the gear is translated into rotation of the hub and the drive roll, the hub including an inner end relatively closer to the gear and an outer end relatively farther from the gear and configured to receive the drive roll for mounting the drive roll on the drive roll carrier and further comprising a bearing at each of the hub inner and outer ends for supporting the hub for rotation;

a retainer that extends from the outer circumferential surface of the hub and fixed in a longitudinal direction with respect to the hub and movable in a generally radial direction with respect to the hub for accommodating mounting of and selectively holding the drive roll on the drive roll carrier;

a lug that extends longitudinally with respect to the hub and radially outward of the hub outer circumferential surface, the lug engaging the drive roll for transferring rotation of the hub to the drive roll and having an outer end that is arranged closer to the hub outer end than the retainer so that the drive roll engages the outer end of the lug to align the drive roll with the lug while mounting the drive roll on the drive roll carrier; and wherein the gear and hub are integral with each other so that the bearing of the hub inner end is arranged within the gear.

* * * * *